UNITED STATES PATENT OFFICE.

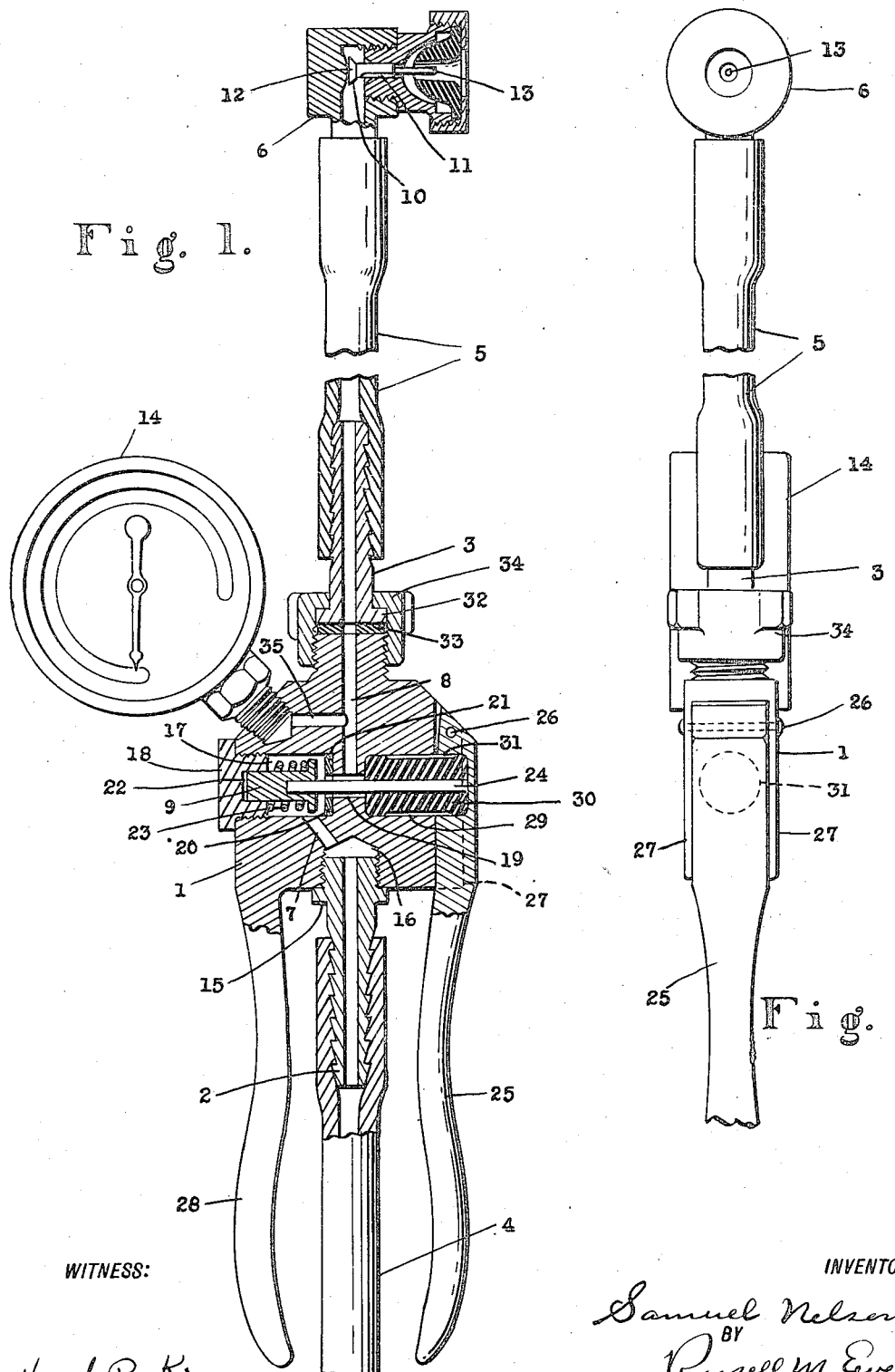

SAMUEL NELSON, OF SOUTH ORANGE, NEW JERSEY.

INFLATING APPARATUS.

1,259,431.  Specification of Letters Patent.  Patented Mar. 12, 1918.

Application filed June 29, 1916. Serial No. 106,586.

*To all whom it may concern:*

Be it known that I, SAMUEL NELSON, a citizen of the United States, and a resident of South Orange, in the county of Essex and State of New Jersey, have invented certain new and useful Improvements in Inflating Apparatus, of which the following is a specification.

This invention relates to means for inflating or filling a body or receptacle with a gaseous or compressible fluid and more particularly it relates to the inflation of pneumatic tires with compressed air.

The objects of the invention are to provide a device by which the inflow of compressed air to a tire is easily and positively controlled by the operator without liability of leakage or loss; to guard against careless or rough handling of the device; to provide a transverse valve with a packing cushion which cannot be unduly compressed and which is not likely to be lost; to this end to provide stops limiting motion of the operating handle in both its directions; to provide for coöperation with said operating handle a fixed handle, said handles being at opposite sides of the supply pipe connection so that when grasped in the hand the same will be inclosed and protected; at the same time to afford free access to said supply pipe connection when desired, and to obtain other advantages and results as may be brought out in the following description.

Referring to the accompanying drawing, in which like numerals of reference indicate the same parts throughout the several views, Figure 1 is a longitudinal sectional view of an apparatus embodying my invention, and Fig. 2 is a side elevation looking from the right hand side of Fig. 1.

In the specific embodiment of the invention illustrated in said drawing, the reference numeral 1 indicates the body portion of my improved device, the same being provided with nipples 2, 3 preferably projecting from opposite ends of the body portion in substantial alinement. One of these nipples, as 2, is connected to the source of air supply or pressure (not shown) by suitable tubing 4 and the other nipple 3 communicates by means of tubing 5 with an "acorn" or other suitable valve connection 6 for attachment to the valve of the tire or other article to be inflated. Passages 7, 8 extend inwardly within the body portion from the nipples 2, 3 respectively, and a valve 9 movable in a direction transverse to the said passages controls the flow of air from one to the other, said valve normally closing communication between said passages and being manually opened by the operator when a flow is desired.

It will be understood that when the valve 9 is open air can pass through the passages 7 and 8 and through the tubing 5 to the valve connection 6. This connection is itself provided with an interior valve 10 which is shown open in the drawing so that air could pass through its groove 11 and so escape from the nozzle or connection. In practice, however, the compressed air would act upon the head 12 of the valve 10 and seat the same so that no air could escape from the nozzle or connection, unless the same were pressed against the valve of the tire or other article, when the stem 13 opens both the tire valve and the connection valve 10, as is common in the art and well understood. Thus if the valve 9 of my apparatus is opened and the tire valve connection 6 is pressed against the tire valve so as to open the connection valve 10 compressed air may be passed freely into the tire.

When the operator thinks he has reached the desired pressure in the tire, he allows the main valve 9 to close and cut off the supply of air from the tank or pump, at the same time holding the valve connection or nozzle stem seated so that its communication with the tire is open. Thereupon the pressure in the tire will back up through the valve connection tubing 5 and passage 8 of the body portion to a pressure gage 14 suitably mounted upon the body portion of my apparatus and communicating with the passage 8. This will at once show the operator what pressure of air is in the tire and if not sufficient he can open the main valve 9 again and continue inflow to the tire. Clearly with one hand holding the body portion so as to conveniently operate the main valve 9 and the other hand holding the valve connection 6, my improved apparatus can be very easily and quickly operated. If at any time it is desired to know the pressure in the supply tank, it is necessary only to open the main valve 9 when the valve connection 6 is disconnected from a tire or the like so that its valve 10 will close, whereupon the gage 14 will obviously show the pressure in the tank.

While the detail construction of my improved apparatus may be varied in many ways in its manufacture, without departing from the spirit and scope of the invention, I have for purposes of illustration shown the construction next to be described and which construction possesses certain advantages some of which are stated.

The nipple 2 which connects with the source of supply is preferably removable and provided adjacent its end toward the body portion with a circumferential flange 15, said end of the nipple being threaded up to the flange and screwed into a socket 16 in the body portion, the flange limiting the entry of the nipple in said socket so as not to seal the passage in the nipple against the bottom of the socket. In open communication with the socket at its bottom is the passage 7 shown directed in an oblique direction to a transverse valve chamber 17. This valve chamber extends inwardly from one side of the body portion to about the middle thereof and is closed at its outer end by a suitable cap or plug 18; from its inner end leads an extension 19 which intersects the outlet air passage 8 of the body portion and is open at the other or opposite side of the body portion, said extension 19 being reduced where it leaves the valve chamber 17 so as to form a shoulder 20. This shoulder provides a valve seat, as by means of the gasket 21 shown, and it is against this seat that the control valve 9 operates to check the flow of air.

The control valve 9 herein illustrated extends longitudinally of the valve chamber 17 with its outer end in a recess 22 in the cap or plug 18 and is normally pressed toward its seat by a spring 23 surrounding the valve and bearing against a flange or other suitable stop means at the inner end of the valve. A valve stem 24 projects longitudinally from the inner end of the valve 9 and extends loosely through the valve seat and extension 19 of the valve chamber to the other side of the body portion. A handle 25 is arranged longitudinally of the body portion at said other side, being pivoted as at 26 forward of the projecting valve stem 24 to swing toward and away from the body portion, preferably between guiding flanges 27, 27 thereon. The opposite or free end of the handle projects beyond the body portion in the same direction as the inlet nipple 2 and said body portion is also provided with a corresponding fixed handle 28 so that by grasping the two in his hand, the operator can press the swinging handle 25 toward the fixed handle 28. Said swinging handle 25 engages the end of the valve stem 24 so as to unseat the valve when the handles are pressed, and when released the valve seats by virtue of its spring 23 and the valve stem swings the handle 25 outward again.

In order to prevent air from escaping around the valve stem as it flows from passage 7 to passage 8 of the body portion, the extension of the valve chamber is enlarged at the opposite side of the body portion, as at 29, and within said enlargement is a cushion 30 of rubber or other suitable material which fits closely around the stem and against the bottom of the enlargement. Preferably, also, the handle is hollowed out, as at 31, to receive the outer end of the cushion 30, which will therefore be less likely to spread between the handle and body portion and interfere with operation of the device. It will be noted that when the main valve 9 is opened, the cushion 30 is compressed by the handle 25 and will thus form a secure seal against the escape of air.

After the air passes through the valve 9 it is free to enter the passage 8 which intersects the extension 19 through which the valve stem extends between the valve and the cushion 30, said passage 8 being shown in alinement with the outlet nipple 3. This nipple 3 is shown rotatable with respect to the body portion, as by having a peripheral flange 32 at its inner end or end next the body portion, said flange seating against the body portion, with suitable packing 33 interposed and held by a nut 34 overlying the flange and screwed onto the body portion. Between this end of the body portion and the transverse valve chamber 17 a branch passage 35 leads from the passage 8 and is adapted at its outer end, as by enlarging and tapping, to receive the pressure gage 14 or other suitable means for indicating the air pressure in the passage 8.

It will be noted that the movement of the handle 25 to compress the cushion 30 is limited by engagement of said handle with the body portion 1 and thus there is no danger of carelessly compressing said cushion too much. Also the other end of the lever 25 engages the body portion as a stop, when the lever handle swings in the other direction, so that it cannot swing too far and the cushion 30 escape or become lost. Furthermore, the handles 25, 28 are at opposite sides of the connection of the supply pipe 4 to its nipple 2, and thus they protect said connection to a certain extent, while permitting ready access to the same between themselves. Particularly when the device is in use, the hand of the operator grasping the handles incloses the said supply pipe connection, at a distance therefrom, and the supply pipe 4 will bend over the soft rounded edge of his hand. In this way great durability is secured and danger of leakage and loss of air are automatically avoided.

Having thus described the invention, what I claim is:

1. The combination of a body portion having a flow duct through itself with an inlet and an outlet at opposite ends, a transverse valve for controlling flow through said duct having its stem at one side of the body portion, a resilient cushion around said stem, and a handle pivoted on the body portion adapted to slide said valve and compress said cushion, the body portion providing a stop to limit swinging of said handle to compress the cushion.

2. The combination of a body portion having a flow duct through itself with an inlet and an outlet at opposite ends, a transverse valve for controlling flow through said duct having its stem at one side of the body portion, a resilient cushion around said stem, and a handle pivoted to said body portion and recessed to receive the outer end of said cushion, said handle adapted to engage said body portion on opposite sides of its point of pivoting to limit its swing in both directions and prevent both release of the cushion and excessive compression thereof.

3. The combination of a body portion having a longitudinal flow duct and centrally disposed means at one end for attaching a supply pipe, a transverse valve for controlling flow through said duct, and a pair of handles projecting longitudinally from said body portion on opposite sides of the supply pipe connecting means, one of said handles being fixed and the other movable and adapted to operate the said transverse valve, said handles permitting access between themselves to said supply pipe connection and affording a grasp by which the hand shall entirely surround said connection without engaging the same.

SAMUEL NELSON.